Patented Jan. 4, 1938

2,104,068

UNITED STATES PATENT OFFICE 2,104,068

QUATERNARY AMMONIUM SALTS OF MERCAPTO-ARYLENETHIAZOLES

William Baird, Blackley, England, assignor to Imperial Chemical Industries Limited, a corporation of Great Britain No Drawing. Application March 15, 1934, Serial No. 715,780. In Great Britain March 15, 1933

7 Claims. (Cl. 260—44)

This invention relates to a new class of chemical compounds.

It is well known that mercaptobenzothiazole and many of its homologues and derivatives form valuable accelerators for the vulcanization of rubber. The homologues and derivatives of mercaptobenzothiazole are of varying degrees of activity. Most of them are somewhat less active than mercaptobenzothiazole itself.

An object of the present invention is to provide a new class of accelerators for the vulcanization of rubber. A further object is to improve the vulcanization of rubber. Another object is to provide a class of new chemical compounds which are useful as accelerators for the vulcanization of rubber. Still another object is to provide a method for preparing such new chemical compounds. Still further objects are to provide new compositions of matter and to advance the art. Other objects will appear hereinafter.

These objects may be accomplished in accordance with my invention which comprises effecting interaction between a quaternary ammonium halide and a metallic derivative of a mercapto-arylene-thiazole, such as mercaptobenzothiazole, whereby new chemical compounds are produced which are effective accelerators for the vulcanization of rubber. Preferably the reaction is caused to take place in a medium in which at least one of the reactants is soluble and at least one of the products of the reaction is insoluble.

Suitable quaternary ammonium salts include the alkyl- and aralkyl-pyridinium halides, aralkyltrialkylammonium halides and tetra-alkylammonium halides. The alkyl and aralkyl pyridinium halides may be represented by the formula:

wherein X represents a halogen, A represents an aklyl or aralkyl group such as methyl, ethyl, propyl, hexadecyl, benzyl and the like and the group

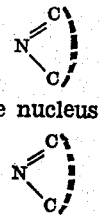

represents a pyridine nucleus. The group will include such compounds as pyridine, picoline, quinoline, isoquinoline, collidenes and lutidenes. The aralkyltrialkylammonium halides and tetra-alkylammonium halides may be represented by the formula:

wherein X represents a halogen, A' represents an alkyl group or an aralkyl group and $A_1$, $A_2$ and $A_3$ represent alkyl groups which may be the same or different.

I have found that, when such quaternary ammonium halides are reacted with a metallic derivative of a mercapto-arylene-thiazole such as the sodium salt of mercaptobenzothiazole, the halogen is replaced by the thiazole group to form compounds which may be represented by the general formula:

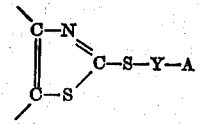

wherein A represents an alkyl or aralkyl radical and Y represents a pyridine nucleus or a trialkyl ammonium nucleus. When Y represents a pyridine nucleus, the compounds will have the general formula:

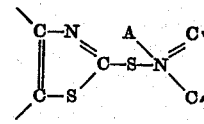

wherein A represents an alkyl or aralkyl group and the group

represents a pyridine nucleus. When Y represents a trialkyl ammonium group, the compounds may be represented by the formula:

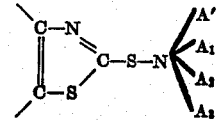

wherein A' represents an alkyl group or an aralkyl group and $A_1$, $A_2$ and $A_3$ represent alkyl groups. The formula

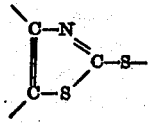

represents a 1-mercapto-arylene-thiazole radical wherein the two doubly bonded carbon atoms are part of a benzene ring.

Among the compounds which I have found to be particularly valuable as accelerators for the vulcanization of rubber are hexadecylpyridinium 1-benzothiazyl sulfide, hexadecyltrimethyl ammonium 1-benzothiazyl sulfide, benzyltrimethylammonium 1-benzothiazyl sulfide, 2',3'-dihydroxypropylpyridinium-1-benzothiazyl sulphide, benzylpyridinium 1-benzothiazyl sulphide and B-hydroxyethylpyridinium 1-benzothiazyl sulphide.

In order to more clearly illustrate my invention and the preferred modes of carrying the same into effect the following examples are given:

Example 1

3.84 parts of the quaternary salt derived from hexadecylbromide and pyridine are dissolved in 50 parts of hot benzene. 1.9 parts of the sodium salt of 1-mercaptobenzothiazole are added to the solution. After refluxing for 3½ hours, the solution is filtered. The filtrate, on cooling, deposits yellow glistening leaves of hexadecylpyridinium 1-benzothiazyl sulphide, m. p. 102–105° C.

Example 2

A preparation similar to the above is made by using hexadecyltrimethylammonium bromide in place of hexadecylpyridinium bromide. This gives hexadecyltrimethylammonium-1-benzothiazyl sulphide which is fairly soluble in benzene. This substance forms white leaflets, m. p. 120–130° C., from aqueous acetone.

Example 3

10 parts of benzyltrimethylammonium chloride are dissolved in a mixture of 50 parts of methyl alcohol and 50 parts of benzene and the solution refluxed with 10 parts of the sodium salt of 1-mercaptobenzothiazole for 1 hour and filtered. An oily residue is obtained on removing the solvent. This residue, on stirring with water, becomes solid. Recrystallization from benzene-acetone gives yellow leaflets, m. p. 85–86° C.

Example 4

5.2 parts of the quaternary ammonium salt derived from glycerol chlorohydrin and pyridine, are dissolved in 50 parts of methyl alcohol and the solution refluxed with 4.75 parts of the sodium salt of 1-mercaptobenzothiazole for 1 hour. The solution is filtered and the solvent distilled off, leaving a viscous oil. This oil crystallized from a benzene-alcohol mixture giving 2',3'-dihydroxypropylpyridinium-1-benzothiazyl sulphide, m. p. 104–107° C. This substance is easily soluble in water.

Example 5

20 parts of benzylpyridinium chloride are dissolved in 100 parts of water and added, with stirring, to a solution of 19 parts of the sodium salt of 1-mercaptobenzothiazole in 100 parts of water. An oil commences to separate immediately. After stirring for 12 minutes, the stirring is discontinued and the oil separated by mechanical means. The product, benzylpyridinium benzothiazyl sulphide, is a pale reddish colored mobile oil.

Example 6

8 parts of B-hydroxyethylpyridinium chloride and 9.5 parts of the sodium salt of 1-mercaptobenzothiazole are dissolved in 25 parts of methyl alcohol. The solution is boiled under a reflux condenser for 2 hours, filtered and the solvent removed from the filtrate under reduced pressure. The product, B-hydroxyethylpyridinium benzothiazyl sulphide, is a brownish viscous oil which is soluble in water.

While, in the above examples and tests, certain derivatives of 1-mercaptobenzothiazole have been prepared and disclosed, like derivatives of other mercaptoarylene thiazoles may be similarly prepared and will be found to be effective accelerators of the vulcanization of rubber. Other mercaptoarylene thiazoles, which may be substituted for 1-mercaptobenzothiazole in the preparation of such derivatives which will be found to be effective accelerators, are 1-mercapto N-alpha naphtho thiazole, the dimercapto dithiazole prepared from benzidine and 3,5-dimethyl benzothiazole.

The application of the compounds of this invention in the vulcanization of rubber is disclosed and claimed in my patent, No. 2,014,421 granted September 17, 1935.

While I have disclosed the preferred embodiments of my invention, it will be readily apparent to those skilled in the art that many variations and modifications may be made therein and in the methods of preparing the new compounds and compositions without departing from the spirit of my invention. Accordingly the scope of my invention is to be limited solely by the appended claims construed as broadly as is permissible in view of the prior art.

I claim:

1. Benzyltrimethylammonium 1-benzothiazyl sulphide.

2. Hexadecyltrimethylammonium-1-benzothiazyl sulphide.

3. A compound having the formula

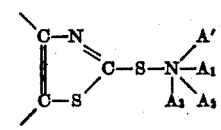

wherein the doubly bonded carbon atoms form part of a single naphthalene ring the carbon bonded to the N being in the alpha position, A' represents a member of the group consisting of alkyl and aralkyl groups in which the aryl group is of the benzene series, and $A_1$, $A_2$ and $A_3$ represent separate alkyl groups.

4. A compound having the formula

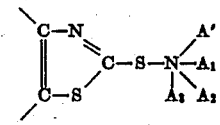

wherein the doubly bonded carbon atoms form part of a benzene ring in an arylene radical of the benzene and naphthalene series, A' represents a member of the group consisting of alkyl and aralkyl groups in which the aryl group is of the benzene series and $A_1$, $A_2$ and $A_3$ represent separate alkyl groups.

5. A compound having the formula

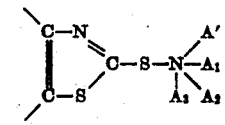

wherein the doubly bonded carbon atoms form part of a benzene ring in an arylene radical of the benzene and naphthalene series, A' represents a benzyl radical, and $A_1$, $A_2$ and $A_3$ represent separate methyl radicals.

6. A compound having the formula

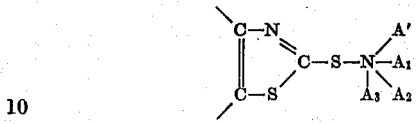

wherein the doubly bonded carbon atoms form part of a benzene ring in an arylene radical of the benzene series, A' represents a member of the group consisting of alkyl and aralkyl groups in which the aryl group is of the benzene series and $A_1$, $A_2$ and $A_3$ represent separate alkyl groups.

7. A compound having the formula

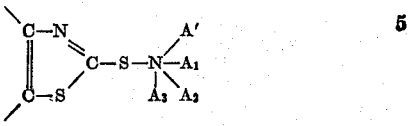

wherein the doubly bonded carbon atoms form part of a benzene ring in an arylene radical of the benzene series, A' represents a benzyl radical, and $A_1$, $A_2$ and $A_3$ represent separate methyl radicals.

WILLIAM BAIRD.